United States Patent [19]
Pereira

[11] 4,084,195
[45] Apr. 11, 1978

[54] IMAGE DATA REMAPPING SYSTEM

[75] Inventor: Lawrence William Pereira, San Jose, Calif.

[73] Assignee: International Business Machines Corporation, Armonk, N.Y.

[21] Appl. No.: 755,866

[22] Filed: Dec. 30, 1976

[51] Int. Cl.² .................... H04N 1/40; H04L 17/30
[52] U.S. Cl. .................................. 358/280; 178/25; 178/30; 346/75; 358/263
[58] Field of Search .................. 358/263, 280, 256; 346/153, 155, 75; 178/25, 30

[56] References Cited

U.S. PATENT DOCUMENTS

| | | | |
|---|---|---|---|
| 3,558,811 | 1/1971 | Montevecchio | 358/256 |
| 3,609,238 | 9/1971 | Hodel | 178/25 |
| 3,689,693 | 9/1972 | Cahill | 358/263 |
| 3,711,646 | 1/1973 | Vermilion | 178/25 |
| 3,745,243 | 7/1973 | Seitz | 358/263 |
| 3,904,816 | 9/1975 | Taudt | 358/256 |
| 3,945,019 | 3/1976 | Veno | 346/155 |
| 4,000,486 | 12/1976 | Schomburg | 178/30 |
| 4,009,332 | 2/1977 | Van Hook | 358/280 |

*Primary Examiner*—Howard W. Britton
*Attorney, Agent, or Firm*—John P. Scherlacher; Otto Schmid, Jr.

[57] ABSTRACT

A system remaps image data generated by successive sweeps of the image by a single transducer element into a format for use by a print head assembly which requires the simultaneous application of plural modulating signals to a plurality of print elements thereon to effect printing of the image. Horizontal strips of the image data corresponding to the height of the arrangement of print elements within the head assembly are successively transferred from a page buffer which stores the image to a horizontal strip buffer, from which successive columns of each strip along the length thereof are transferred through a rotator for rearrangement into new groups of data oriented at right angles relative to the prior arrangement thereof for storage in a vertical strip buffer. From the vertical strip buffer the new groups of data are applied through deserializers to modulate the plural print elements in the form of ink jet nozzles as the head assembly undergoes successive sweeps across a printable medium.

18 Claims, 10 Drawing Figures

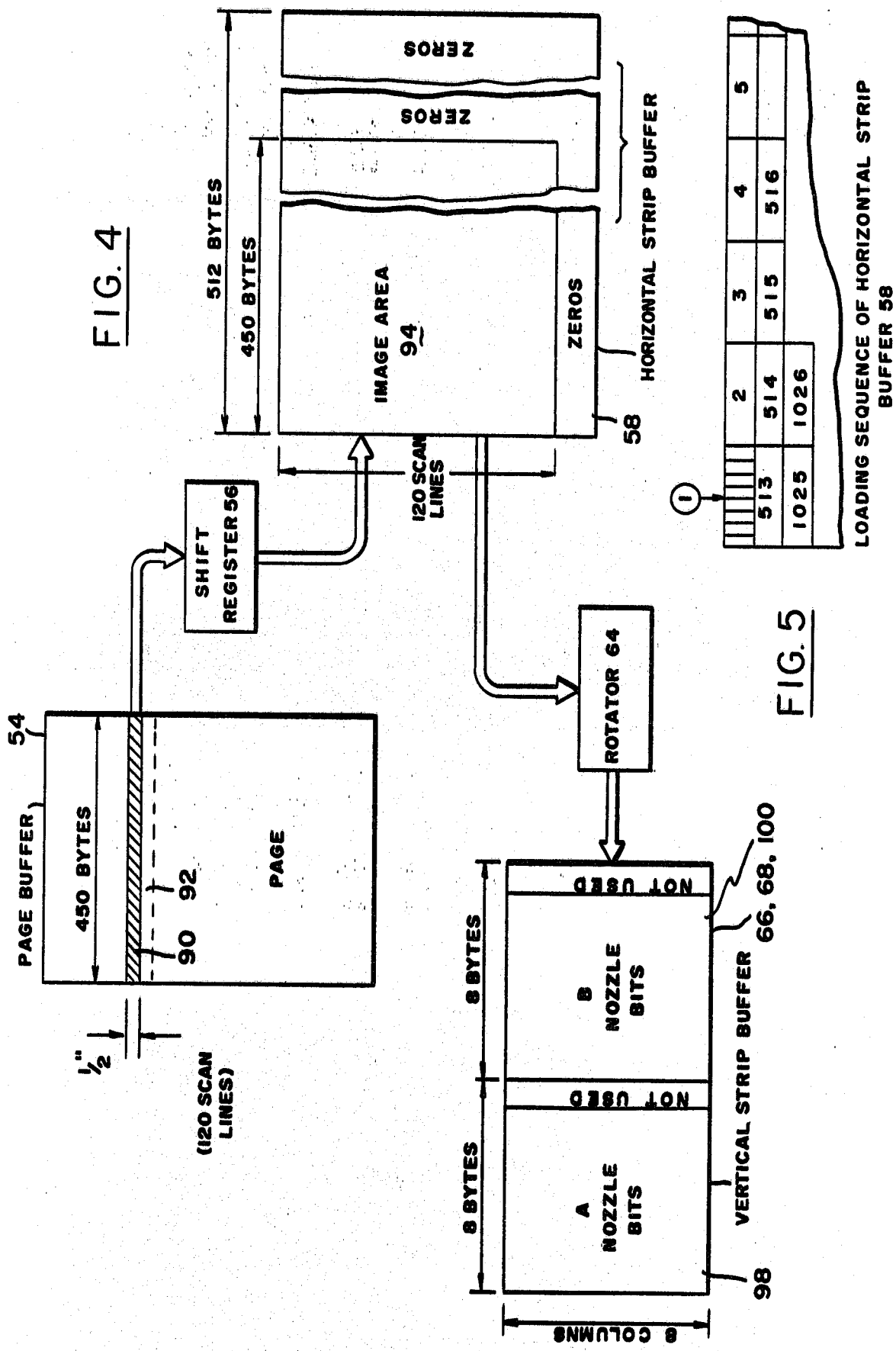

UNLOADING SEQUENCE OF VERTICAL STRIP BUFFER

IMAGE DATA REMAPPING SYSTEM

BACKGROUND OF THE INVENTION

1. Field of the Invention

The present invention relates to systems for processing and printing images represented by digital data, and more particularly to systems in which the images are represented by and printed using data in a dot matrix or similar format.

2. History of the Prior Art

It is well known in the printer art to scan an image or otherwise generate image data in raster fashion using a single transducer which generates serial bit data as it undergoes successive sweeps along scan lines covering the image. Such data may be stored, subsequently processed as appropriate, and ultimately used to reproduce the image or portions thereof using printers such as of the ink jet or impacting type. In such printers, printing is usually accomplished by applying the data, serially by bit, to the single transducer which may comprise an ink jet nozzle or impacting rod or other print tip as successive scans of a printable medium are made.

As the state of the art has progressed it has been found that the speed of processing and printing image data can be increased by presenting the data in parallel for the simultaneous modulation of a plurality of print elements. Thus the ability to simultaneously print along a plurality of scan lines during a given sweep by the head assembly greatly increases the printing speed and may, for example, enable the printing of a complete line of characters rather than a small horizontal portion thereof with each sweep of the head assembly. However, difficulty is encountered in those situations where the image data is generated by one type of transducer such as that employing a single transducing element and is thereafter to be used in a printer having a head assembly comprised of plural print elements.

It is known in the art to manipulate images so as to provide rotation, mirror images, cut and paste effects and the like. For example, U.S. Pat. No. 3,678,497 of Watson et al. discloses an arrangement in which a bold character front is generated from a standard character dot matrix by a shift register converter arrangement. To date, however, relatively little has been done to solve the problem of remapping image data for reproduction of the image by a head assembly of different design or configuration than the transducer assembly used to scan the image and generate the image data. A specific need exists in the area where data generated by a single transducing element undergoing successive scans of the image must be remapped for use with a print head assembly requiring simultaneous presentation of data within a plurality of the scan lines.

BRIEF DESCRIPTION OF THE INVENTION

In accordance with the invention image data generated by the successive scans of a single transducer is remapped for printing by a head assembly having a plurality of print elements by a system which stores the data comprising successive strips of the image scanned by the head assembly during printing. The data of each strip is divided into segments or columns along the length thereof with the organization of the data of each segment being rotated prior to application to modulate the print elements of the head assembly. Rotation is accomplished N bytes at a time by storing N bytes and thereafter transferring like bit positions of each of the N bytes as a new group of N bytes for use in modulating the print elements.

Where the head assembly is comprised of two different groups of the print elements displaced from one another in the direction of sweep, those portions of each segment of data covered by the leading group of print elements are rotated and applied to modulate the leading group, following which appropriate portions of another segment spaced from the first segment by a distance equaling the displacement between the groups of print elements are rotated and applied to modulate the trailing group of print elements.

In a specific example of an image data remapping system according to the invention, the image is stored in a page buffer one line at a time, following which like strips of the image are successively removed from the page buffer and stored in a horizontal strip buffer. Each strip is comprised of a number of scan lines equal to the number of nozzles in an ink jet head assembly. The nozzles are arranged in two different columns within the head assembly and are staggered such that the nozzles of each column address alternate scan lines. The lines of each strip stored in the horizontal strip buffer comprise successive bytes such that the strip is divided into a succession of byte columns, each of which is one byte in width and has a height encompassing all the scan lines of the strip.

Alternate bytes within a give byte column are transferred from the horizontal strip buffer into one of a pair of vertical strip buffers by a rotator which effectively rotates the bytes 90°. The alternate bytes are removed from the horizontal strip buffer in groups which are stored in registers within the rotator. New bytes are then formed by transferring the bits in like bit positions from each of the bytes stored in the registers. Upon storage in one of the vertical strip buffers of the new bytes formed from the alternate bytes within a given byte column, the bytes within the intervening scan lines of a column spaced from the given column by the distance between the two columns of nozzles in the head assembly are converted into new bytes by the rotator and are stored in the vertical strip buffer.

The new bytes in the vertical strip buffer are then serially fed to a deserializer which applies them in parallel to modulate the two different columns of nozzles in the ink jet head assembly. The two different vertical strip buffers alternate in function, one being loaded with new bytes from the rotator while the other is being read out to modulate the ink jet nozzles.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIGS. 4–7 are diagrammatic illustrations of portions of the system of FIG. 3, useful in explaining the operation thereof;

DETAILED DESCRIPTION

Figure 1:
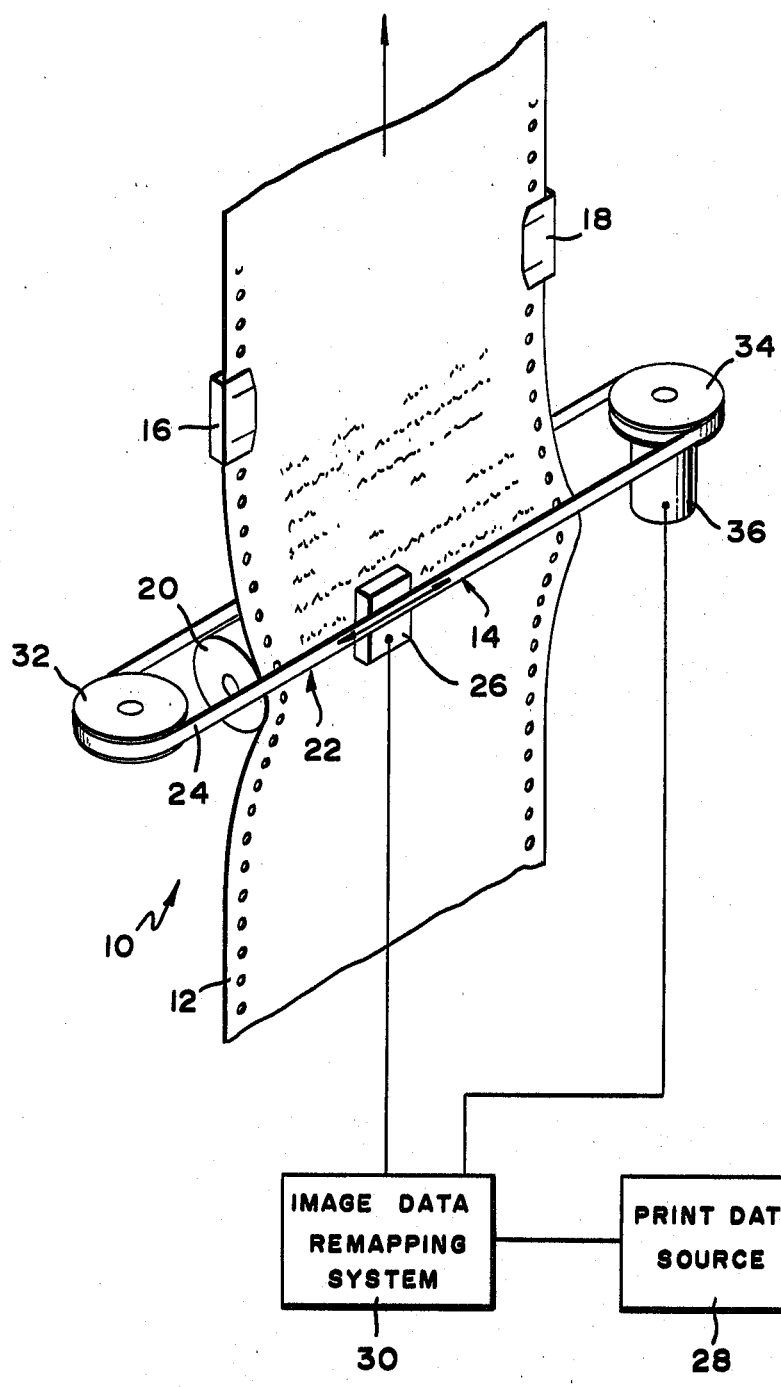
FIG. 1 is a perspective view of an ink jet printer utilizing an image data remapping system in accordance with the invention.

FIG. 1 depicts a printer system 10 which has a printable medium in the form of a paper 12 of conventional perforated edge design. The paper 12 is advanced past a printing station 14 by opposite tractor drives 16 and 18 of conventional design which engage the perforated edges of the paper. The tractor drives 16 and 18 advance the paper 12 in an upward direction over a platen 20 in increments of appropriate size.

A shuttle assembly 22 includes a length of tape 24 having an ink jet head assembly 26 affixed thereto for reciprocal motion across the width of the paper 12. As described in connection with FIG. 2 the head assembly 26 includes a plurality of ink jet nozzles capable of printing a strip of given height across the paper 12 with each sweep of the assembly 22. The individual nozzles are modulated by data bits so as to print in dot matrix fashion. The printer system 10 is capable of printing lines of characters and other images in response to data from a print data source 28 after manipulation by an image data remapping system 30 in accordance with the invention. The image data remapping system 30 is shown and described in detail hereafter in connection with FIGs. 3-10. Mounting and reciprocal motion of the tape 24 and the included ink jet head assembly 26 is provided by a pair of opposite pulleys 32 and 34, the latter of which is driven by a servo motor 36 in response to head controls within the image data remapping system 30.

Figure 2:
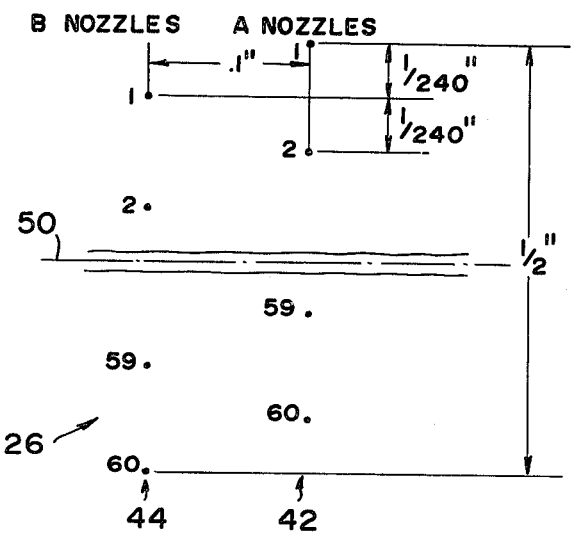
FIG. 2 is a diagrammatic illustration of the arrangement of plural nozzles within the ink jet head assembly of the printer of FIG. 1.

As shown in FIG. 2 the ink jet head assembly 26 is comprised of two different groups of nozzles formed into two different columns. The nozzles in the one column 42 are conveniently designated the "A" nozzles, while the other column 44 is comprised of "B" nozzles. The A nozzles become the leading nozzle column and the B nozzles the trailing column when the head assembly 26 as viewed in FIG. 2 is printing downwardly onto the paper during a sweep from left to right. During a sweep to the left, the B nozzles become the leading column of nozzles and the A nozzles become the trailing column of nozzles. The columns 42 and 44 are separated by a distance of 0.1 inch.

Each column of nozzles 42, 44 is comprised of 60 nozzles which are staggered in their location so as to alternate between the two columns with increasing distance from an imaginary axis 50 extending in the directions of the sweeps of the head assembly 26. Consequently, adjacent nozzles in each column are spaced apart by 1/120 inch. Each nozzle within each column is spaced apart from the axis 50 by a distance which is 1/240 inch greater or less than the distance between adjacent nozzles in the other column and the axis 50.

The two different columns of nozzles 42, 44 cover a band or strip ½ inch high extending across the width of the paper 12. At the same time each nozzle defines a separate scan line such that the strip or band across the paper 12 is comprised of 120 scan lines spaced 1/240 inch apart.

In the present example the print data source 28 provides image data serially by bit, one scan line at a time. This is typical of many image scanners and related equipment. It is also true of central processing units and system components which may generate image data in this format for convenience, for compatability with other system components, or for various other reasons.

Figure 3:
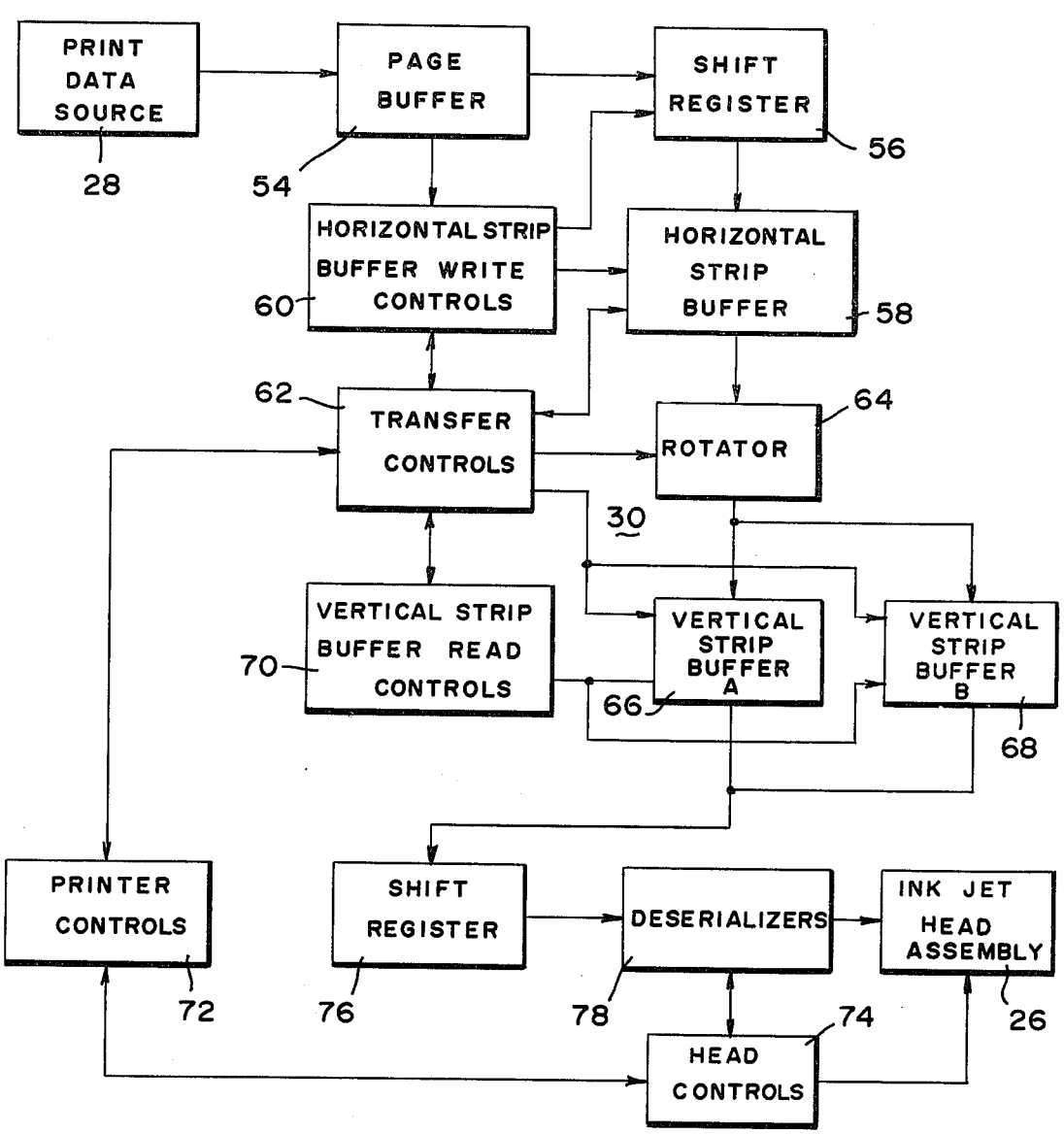
FIG. 3 is a block diagram of the image data remapping system of the printer of FIG. 1.

FIG. 3 shows in detail the system 30 according to the invention for remapping the image data provided by the print data source 28 into a suitable format for use by the print head assembly 26 shown in FIG. 2. The image data remapping system 30 includes a page buffer 54 for storing the image data, scan line by scan line, as it is received from the print data source 28. The page buffer 54 is coupled through a shift register 56 to a horizontal strip buffer 58. The shift register 56 and the horizontal strip buffer 58 operate under the control of horizontal strip buffer write controls 60 which are responsive to the conditions within the page buffer 54 as well as to transfer controls 62. The transfer controls 62 also control a rotator 64 coupled to the horizontal strip buffer 58 and to A and B vertical strip buffers 66 and 68, respectively. The vertical strip buffers 66 and 68 are also controlled by vertical strip buffer read controls coupled to the transfer controls 62.

Printer controls 72 control the image data remapping system 30 via the transfer controls 62 and the ink jet head assembly 26 via head controls 74. The head controls 74 also control a shift register 76 coupled to the outputs of the vertical strip buffers 66 and 68 and head deserializers 78 coupled between the shift register 76 and the head assembly 26.

When the various parts of the printer system 10 including the head assembly 26 and the image data remapping system 30 are ready to print, the printer controls 72 cause the transfer controls 62 to initiate operation of the horizontal strip buffer write controls 60. The horizontal strip buffer write controls 60 determine if a number of scan lines of data sufficient to comprise a horizontal strip are present in the page buffer 54. If the required number of scan lines is present in the page buffer 54, the lines are applied, one at a time, to the shift register 56 where the individual bytes of each line are loaded in parallel from the shift register 56 into the horizontal strip buffer 58. The process continues until the data comprising all of the scan lines of a horizontal strip, 120 lines in the present example, is loaded in the horizontal strip buffer 58.

With a horizontal strip loaded in the horizontal strip buffer 58, the transfer controls 62 respond by causing the data within the horizontal strip buffer 58 to be transferred to one or the other of the vertical strip buffers 66 and 68 via the rotator 64. The bytes along the scan lines of the strip stored within the horizontal strip buffer 58 define a succession of segments or byte columns along the length of the strip. The bytes comprising each column are transferred in groups of convenient size to the rotator 64 where they are temporarily stored. New groups of bytes are then formed by the particular manner in which the data temporarily stored in the rotator 64 is transferred to one of the vertical strip buffers 66 and 68. More specifically, vertical bytes each comprised of bits from the like bit positions of the different horizontal bytes from the horizontal strip buffer 58 stored in the rotator 64 are formed by transferring the data in such a format to one of the vertical strip buffers 66 and 68. In this manner the data comprising the strips stored in the horizontal strip buffer 58 is effectively remapped by rotation 90° and storage in one of the vertical strip buffers 66 and 68 in preparation for modulating the various nozzles of the ink jet head assembly 26.

The vertical strip buffers 66 and 68 alternate in function under the control of the vertical strip buffer read controls 70 and the transfer controls 62. While one of the vertical strip buffers is having the data stored therein read out and applied to the ink jet head assembly 26, the other vertical strip buffer is being loaded with data from the rotator 64. The data within the vertical strip buffer 66 and 68 to be used to modulate the ink jet head assembly 26 is read out, one byte at a time, to the shift register 76 where each byte is applied serially to the head deserializers 78. The deserializers 78 under control of the head controls 74 assemble the various bytes applied to the shift registers 76 into parallel groups of bits which are alternately applied to modulate the A nozzles 42 and the B nozzles 44.

Each time more modulation data is needed at the head assembly 26, the head controls 74 communicate this fact to the transfer controls 62 via the printer controls 72. The transfer controls 62 respond by continuing the transfer of horizontal strips from the page buffer 54 to the horizontal strip buffer 58 via the shift register 56 whenever there are enough scan lines of data stored in the page buffer 54 to define a new horizontal strip. At the same time the transfer controls 62 continue to respond to each loaded condition within the horizontal strip buffer 58 by rotating and storing the data thereof within one of the vertical strip buffers 66 and 68. The transfer controls 62 select one of the vertical strip buffers 66 and 68 for receipt of the new data based on the fact that the other vertical strip buffer is being used to read out the data stored therein through the shift register 76 and the head deserializers 78 to the head assembly 26 under the control of the vertical strip buffer read controls 70.

The page buffer 54, the horizontal strip buffer 58 and one of the vertical strip buffers 66 and 68 are diagrammatically illustrated in FIG. 4. As previously noted the page buffer 54 stores a page or other image to be printed, one scan line of data at a time. Each scan line comprises a sequence of 8-bit bytes extending along the length thereof. In the present example each page within the page buffer 54 has a maximum width of 450 bytes. A horizontal strip 90 shown in FIG. 4 is therefor 450 bytes long. The 120 scan lines thereof provide the strip 90 with a height of 0.5 inch corresponding to the height of the arrangement of 120 ink jet nozzles in the head assembly 26. The horizontal strips are transferred in succession to the horizontal strip buffer 58 through the shift register 56. The sequence of transfer begins at the top of the page buffer 54 and progresses downwardly. Accordingly, after the strip 90 is transferred to the horizontal strip buffer 58 and is thereafter remapped, the horizontal strip buffer write controls 60 cause the next strip 92 shown in dotted outline in FIG. 4 to be transferred to the horizontal strip buffer 58.

The horizontal strip buffer 58 provides a data storage area which is 512 bytes wide and approximately 128 scan lines high. The image area 94 thereof corresponds to each strip transferred from the page buffer 54 and is 450 bytes wide and 120 scan lines high. The remaining areas of the horizontal strip buffer 58 which aid in defining the boundaries of the image area 94 are loaded with zeros as each strip is transferred into the buffer 58. Thus the area 62 bytes wide at the right hand edge of the buffer 58 is loaded with zeros as each strip is transferred from the page buffer 54. Also the bottom portion of the buffer 58 which is approximately 8 scan lines high is loaded with zeros.

As previously noted each scan line from a strip in the page buffer 54 is loaded, byte-by-byte, into the horizontal strip buffer 58 via the shift register 56. Each byte is serially advanced out of the page buffer 54 to the shift register 56 which then loads the eight bits of the byte in parallel into the horizontal strip buffer 58. FIG. 5 depicts the loading sequence of the horizontal strip buffer 58. As shown in FIG. 5 the first scan line of the horizontal strip is loaded beginning with the first byte in the upper lefthand corner of the image area 94. Thereafter the second byte is loaded, then the third byte, and so on until the 450 bytes of the first scan line have been transferred. The first scan line is then completed by writing imaginary bytes 451 through 512 as zeros across the righthand edge of the horizontal strip buffer 58. The second scan line of the horizontal strip is then transferred and loaded by loading the 513th byte, then the 514th byte, and so on, immediately under the first scan line beginning at the lefthand edge of the image area 94. When loading of the second scan line is complete, the third scan line is loaded beginning with the 1025th byte, then the 1026th byte, and so on. The process continues until the complete horizontal strip is loaded in the horizontal strip buffer 58 together with zeros at the righthand edge and at the bottom.

Referring again to FIG. 4, each horizontal strip which is loaded in the horizontal strip buffer 58 is remapped by the rotator 64 and one of the vertical strip buffers 66 and 68. Each byte column within the horizontal strip buffer 58 is comprised of 120 bytes. As described in greater detail hereafter the bytes in alternate scan lines within each column are transferred by the rotator 64 and stored in a first portion 98 of the vertical strip buffer 66, 68 being used to store the data. The portion 98 comprises 8 columns of 16 bytes each, 8 of the bytes lying within the portion 98 and the other 8 bytes lying within a portion 100 of the buffer. Consequently the portion 98 has a 64 byte capacity. However, only 60 bytes are transferred from a given byte column in the horizontal strip buffer 58. An area ½ byte wide at the righthand edge of the portion 98 is not used. The portion 100 of each vertical strip buffer is identically arranged so as to store 60 bytes from the horizontal strip buffer 58 with a 4 byte area not being used.

Following transfer of the 60 bytes from odd numbered scan lines within a given byte column in the horizontal strip buffer 58 to the portion 98 of the vertical strip buffer 66 or 68, the 60 bytes from even numbered scan lines in a different byte column are transferred into the portion 100. The column from which the bytes stored in the portion 100 are transferred is displaced from the given column by a distance equal to the distance between the columns of A and B nozzles 42 and 44. The bytes in the portion 98 are then applied to modulate the A nozzles and the bytes in the portion 100 are applied to modulate the B nozzles. The first column of eight bytes in the portion 98 is applied to the A nozzles, following which the first column of eight bytes in the portion 100 is applied to modulate the B nozzles. Next the second column of eight bytes in the portion 98 is applied to modulate the A nozzles, following which the second column of eight bytes in the portion 100 is applied to modulate the B nozzles. The process continues until all of the bytes within the portions 98 and 100 have been transferred through the shift register 76 and the head deserializers 78 to modulate the ink jet nozzles. Simultaneously with transfer of the bytes stored in the portions 98 and 100 to modulate the ink jet nozzles, the system advances to the next pair of byte columns in the horizontal strip buffer 58 so as to rotate odd-numbered bytes from one column for storage in the portion 98 of the other vertical strip buffer and even-numbered bytes from the other column for storage in the portion 100 of the other vertical strip buffer.

Figure 6:
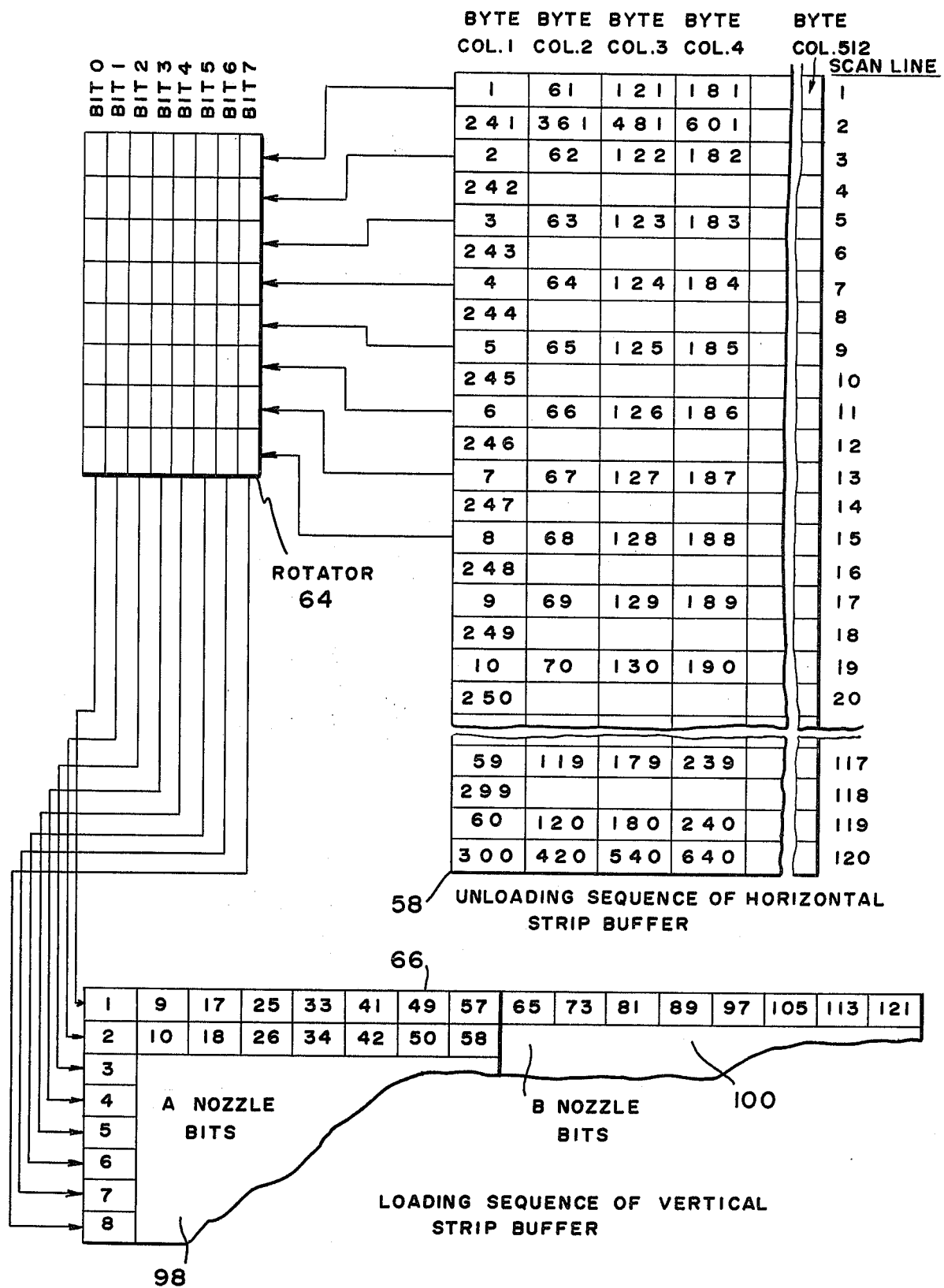
Figure 7:
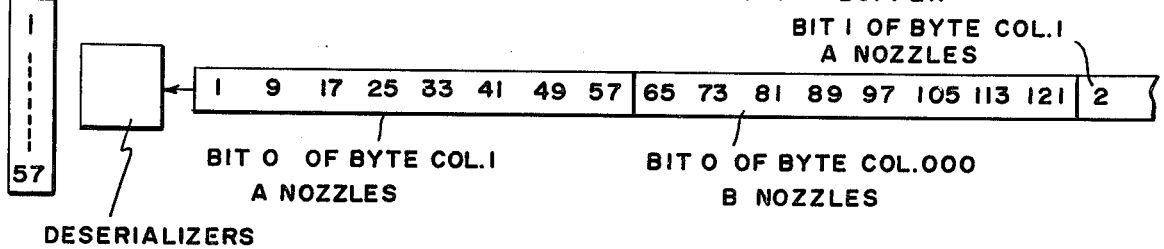

The manner in which the columns of bytes of the horizontal strips stored in the horizontal strip buffer 58 are rotated and stored in one of the vertical strip buffers 66, 68 is shown in detail in FIGS. 6 and 7 to which reference is now made. Assuming that a horizontal strip of data has just been transferred to the strip buffer 58 and is ready for rotation and storage in the vertical strip buffer 66, the first eight bytes in odd-numbered scan lines of the first byte column (designated byte col. 1) are transferred in parallel into the rotator 64. These horizontal bytes or rows are then converted into eight vertical bytes or columns such that each vertical byte comprises like bit positions of the different horizontal bytes. More specifically, the zero bits of each of the eight bytes from the horizontal strip buffer 58 are transferred to the vertical strip buffer 66 as a first new vertical byte. Next, the bits in the bit 1 position of the eight stored bytes are transferred to the vertical strip buffer 66 as the second new vertical byte. The process continues until the last (bit 7) bits of each stored byte are transferred as the 8th new vertical byte. The eight new vertical bytes are stored as the first byte in each of the eight columns in the portion 98 of the vertical strip buffer 66 as shown in FIG. 6.

Following rotating and storage of the first eight bits in odd-numbered scan lines in byte col. 1 of the horizontal strip buffer 58, the next eight bytes in odd-numbered scan lines of byte col. 1 comprising bytes 9-16 are rotated and stored in the vertical strip buffer 66 as new vertical bytes 9-16. The procedure continues until bytes 57-60 in the last four odd-numbered scan lines of byte col. 1 are addressed. These four bytes are entered in the rotator 64 and are used to form the first four bits of each of the eight new vertical bytes 57-64. The remaining four bit positions of each of bytes 57-64 are left blank. The 64 new vertical bytes stored in the portion 98 of the vertical strip buffer 66 are applied to the A nozzles 42 of the head assembly 26 to print the odd scan lines of byte col. 1. The application of the columns of bytes in the portion 98 to modulate the A nozzles is alternated with application of the columns of bytes stored in the portion 100 to modulate the B nozzles 44. The column of B nozzles is displaced from the column of A nozzles by 0.1 inch within the head assembly 26. Accordingly if the head assembly 26 is sweeping in a direction from left to right, the B column of nozzles is three bytes behind the A column of nozzles for the strip stored in the horizontal strip buffer 58. This being the case the bytes from the even-numbered scan lines used to modulate the B nozzles must be taken from a byte column three columns to the left of the byte column being used to supply bytes for the A nozzles. Immediately upon rotating the 60 bytes from the odd scan lines of byte col. 1 of the horizontal strip buffer 58 for storage within the portion 98 of the vertical strip buffer 66, the system seeks to address bytes in the even-numbered scan lines of a byte column three column positions to the left of byte col. 1. Since byte col. 1 is the first column at the lefthand edge of the horizontal strip, no bytes are transferred into the portion 100 of the vertical strip buffer 66 and the B nozzles are not modulated to effect printing.

The next step is to address the odd bytes in byte col. 2 for rotation and storage. Bytes 61-68 in the first eight odd numbered scan lines as viewed in FIG. 6 are applied to the rotator 64 for rotation to form eight new vertical bytes which are then stored in the first byte position of each of the 8 byte columns in the portion 98 of the vertical strip buffer 66. The process continues with bytes 69-120 being rotated and stored in the portion 98. At this point the system attempts to address the even bytes three columns to the left of byte col. 2. Since this is off of the lefthand edge of the image area 94, nothing is loaded in the portion 100 of the vertical strip buffer 66 and the B nozzles are not modulated to effect printing.

Next, byte col. 3 is addressed and bytes 121-180 from the odd numbered scan lines are rotated and reformatted in the portion 98 of the vertical strip buffer 66. Again the system attempts to address even line bytes 3 byte columns to the left and does not enter any data in the portion 100 of the vertical strip buffer 66 upon determination that this is beyond the lefthand edge of the horizontal strip buffer 58. The new vertical bytes stored in the portion 98 are applied to modulate the A nozzles to print the odd-numbered scan lines of byte col. 3.

The system next addresses the odd-numbered scan lines in byte col. 4 and reads out bytes 181-240 for rotation and storage in the portion 98 of the vertical strip buffer 66. Upon loading of the new vertical bytes into the portion 98, the system then addresses the even-numbered bytes in byte col. 1 which is three columns to the left of byte col. 4. This results in bytes 241-300 being applied through the rotator for storage in the portion 100 of the vertical strip buffer 66. When the vertical strip buffer 66 is loaded and ready to modulate the ink jet nozzles, the first column of bytes comprising bytes 1, 9, 17, 25, 33, 41, 49 and 57 in portion 98 of the vertical strip buffer 66 is applied by the shift register 67 to the head deserializers 78 which apply all sixty bits of the byte column in parallel to the A nozzles 42 for printing of the bit 0 portion of the odd-numbered scan lines of byte col. 4. Following this the first byte column comprising bytes 65, 73, 81, 89, 97, 105, 113 and 121 in the portion 100 of the vertical strip buffer 66 is applied by the shift register 76 and the head deserializers 78 to modulate the B nozzles 44 to effect printing of the bit 0 portion of the even-numbered scan lines within byte col. 1. Next the second byte column within the portion 98 comprising bytes 2, 10, 18, 26, 34, 42, 50 and 58 is applied to modulate the A nozzles 42 to print the bit 1 portion of the odd-numbered scan lines of byte col. 4. Following that the second byte column in the portion 100 of the vertical strip buffer 66 is applied to modulate the B nozzles 44 to print the bit 1 portion of the even-numbered scan lines in byte col. 1. The remainder of the byte columns within the portions 98 and 100 are read out in alternate fashion and used to modulate the A and B nozzles to complete printing of the bytes in the odd-numbered lines of byte col. 4 and the even-numbered lines in byte col. 1.

Thereafter, the system remaps the bytes from the odd-numbered scan lines in byte col. 5 (not shown in FIG. 6) and bytes 361-420 from the even-numbered scan lines in byte col. 2. Following printing of the areas of the horizontal strip, the system addresses the odd bytes in byte col. 6 (not shown in FIG. 6) and then bytes 481-540 in the even scan lines of byte col. 3. Following printing of the bytes in the odd-numbered scan lines of byte col. 7 (not shown in FIG. 6), bytes 601–640 in the even-numbered scan lines of byte col. 4 are rotated and applied to cause printing. The system continues in this fashion until the complete horizontal strip is printed.

The vertical strip buffers 66 and 68 alternate in function. While the odd bytes from a byte column and the even bytes from a byte column three position to the left thereof are being rotated and stored in one of the vertical strip buffers, the data from two different byte columns previously rotated and stored within the other vertical strip buffer is being applied to modulate the A and B nozzles.

The present discussion has assumed that the ink jet head assembly 26 is sweeping in the direction from left to right. When the head assembly is sweeping in the opposite direction the process is simply reversed. As the head assembly is scanned across the area of the print paper corresponding to 62 bytes of zeros at the right-hand edge of the horizontal strip buffer 58, nothing is printed on the paper. As the B nozzles 44 prepare to pass over the area corresponding to the 450th byte col. of the horizontal strip buffer 58, the bytes from the even-numbered scan lines of the 450th byt col. are rotated and stored for application to the B nozzles. The A nozzles 42 are still over an area corresponding to the zero strip at the right-hand edge of the horizontal stirp buffer 58, and are not modulated to cause printing until the B nozzles begin printing the odd-numbered scan lines of the 447th byte col. The system continues in this fashion until the horizontal strip is printed, following which the next horizontal strip transferred from the page buffer 54 into the horizontal strip buffer 58 is printed by a sweep of the ink jet head assembly 26 from left to right.

FIG. 7 shows the unloading sequence of the vertical strip buffers 66 and 68 as just described in connection with a sweep of the head assembly 26 from left to right. With the vertical strip buffer 66 fully loaded and the system about to begin printing of the odd-numbered scan lines of byte col. 1, the first column of bytes in the portion 98 comprising bytes 1, 9, 17, 25, 33, 41, 49 and 57 is applied to the A nozzles to cause printing of the bit 0 portion of the odd-numbered scan lines of byte col. 1. Immediately thereafter the first column of bytes within the portion 100 of the vertical strip buffers 66 comprising bytes 65, 73, 81, 89, 97, 105, 113 and 121 is applied to the B nozzles to cause printing of the bit 0 position of a byte col. three columns to the left of byte col. 1 (designated byte column 000). In reality bytes 65, 73, 81, 89, 97, 105, 113 and 121 comprise zeros since they are taken from an area off the lefthand edge of the horizontal strip buffer 58. Nothing is printed by the B nozzles until the A nozzles begin printing byte col. 4.

Figure 8:
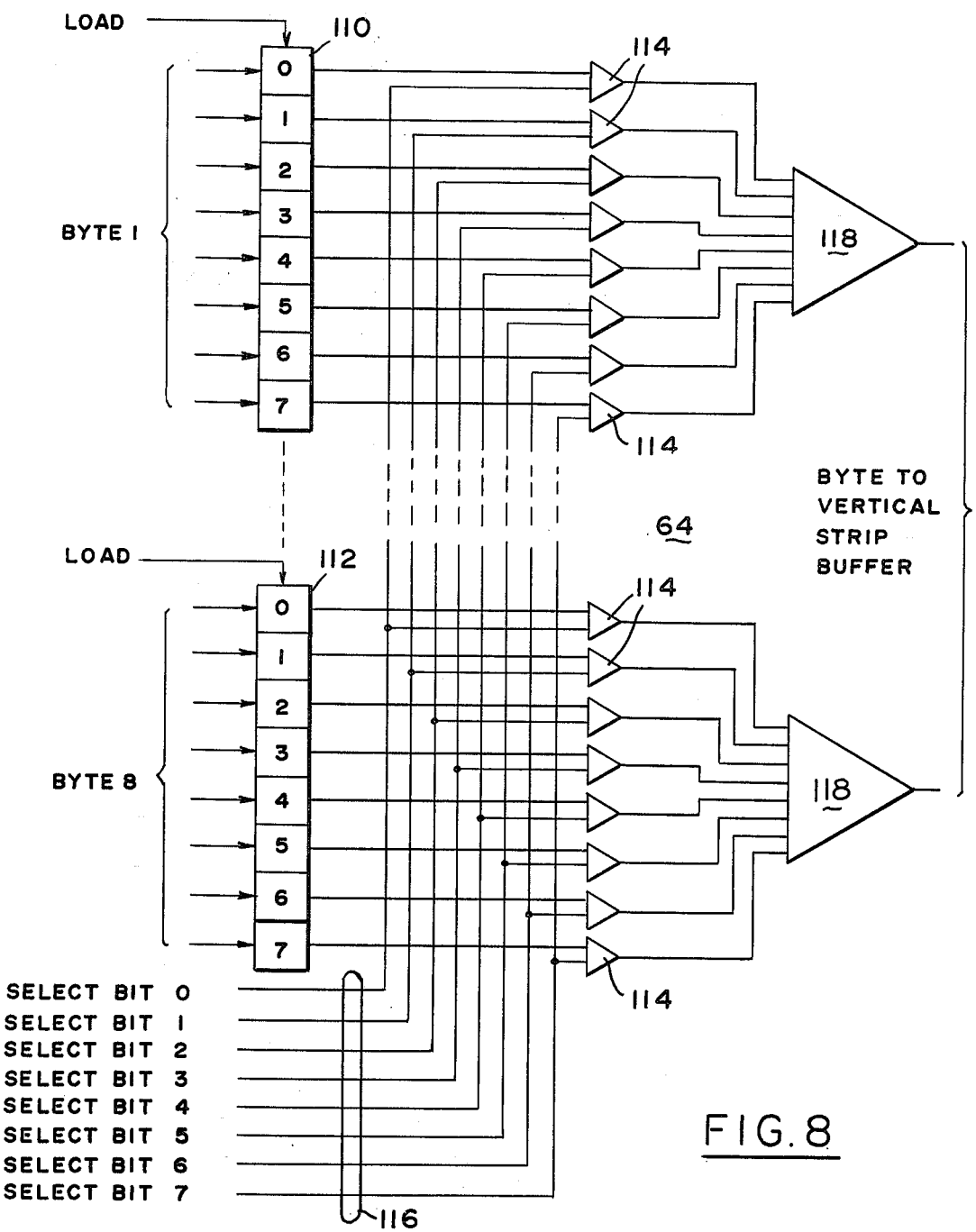
FIG. 8 is a block diagram of the rotator in the system of FIG. 3.

The rotator 64 is shown in detail in FIG. 8. The rotator includes eight different registers with only two being shown in FIG. 8 for reasons of brevity. A first register 110 is coupled to receive the topmost one of the eight bytes being transferred from the horizontal strip buffer 58. A register 112 is coupled to receive the lowermost byte of each group of eight bytes transferred. As each of the first eight bytes in odd-numbered scan lines of the byte column are addressed, the eight different bits of byte 1 are entered in parallel in the register 110. The bits of byte 8 are entered in parallel in the register 112. The bits of bytes 2–7 are entered in parallel in six different registers not shown in FIG. 8 but which are coupled between the registers 110 and 112 in the arrangement of FIG. 8. The various bytes are entered pursuant to load commands to the various registers.

The output of each bit position of each register is coupled to one of two different inputs of a different one of a plurality of AND circuits 114. The other input of each AND circuit 114 is coupled to one of eight different enable lines 116. Each of the eight different enable lines 116 corresponds to a different one of the eight different bit positions (bit 0-bit 7). Accordingly the eight different AND circuits 114 having one input thereof coupled to the different bit positions of one of the registers has the second input thereof coupled to a different one of the eight enable lines 116. Each of the AND circuits 114 has an output coupled to an input of one of a plurality of OR circuits 118. Each of the OR circuits 118 is coupled to the outputs of the eight different AND circuits 114 associated with a particular one of the registers. Each of the various OR circuits 118 provides an output for a different one of the registers.

During operation of the rotator 64 the registers are commanded to load bytes, following which the eight different enable lines 116 are sequentially energized to provide the eight new vertical bytes at the outputs of the OR circuits 118. Thus upon energization of the line 116 corresponding to the bit 0 position, the zero bits in each of the eight registers are simultaneously read out through the associated AND circuits 114 and the OR circuits 118 for transfer to one of the vertical strip buffers 66 and 68. Thereafter the second line 116 corresponding to the bit 1 positions is energized to simultaneously read out the 1 bit of the eight different registers to provide the second new vertical byte to the vertical strip buffer. The process is continued until all eight of the different bit positions of the eight registers have been read out and the eight new bytes stored in the vertical strip buffer. At that point load commands to the registers transfer the next eight bytes of the byte column being addressed in the horizontal strip buffer 58 into the eight registers, whereupon the sequential energization of the eight different enable lines 116 is repeated.

Addressing of the horizontal strip buffer 58 to sequentially select 64 bytes for the A nozzles 42 and 64 bytes for the B nozzles 44 utilizes a base plus displacement scheme. The base remains constant during transfer of 64 bytes for the A nozzles, and is then decremented by three for left to right scan or incremented by three for right to left scan. This causes addressing of the byte column three positions removed to the left or right respectively of the column from which the A nozzle bytes are taken so that the B nozzles bytes can be transferred. This process for altering the base is repeated until the entire horizontal strip has been printed. The displacement is set to zero each time the base is changed and is incremented by 1024 for each byte.

Figure 9:
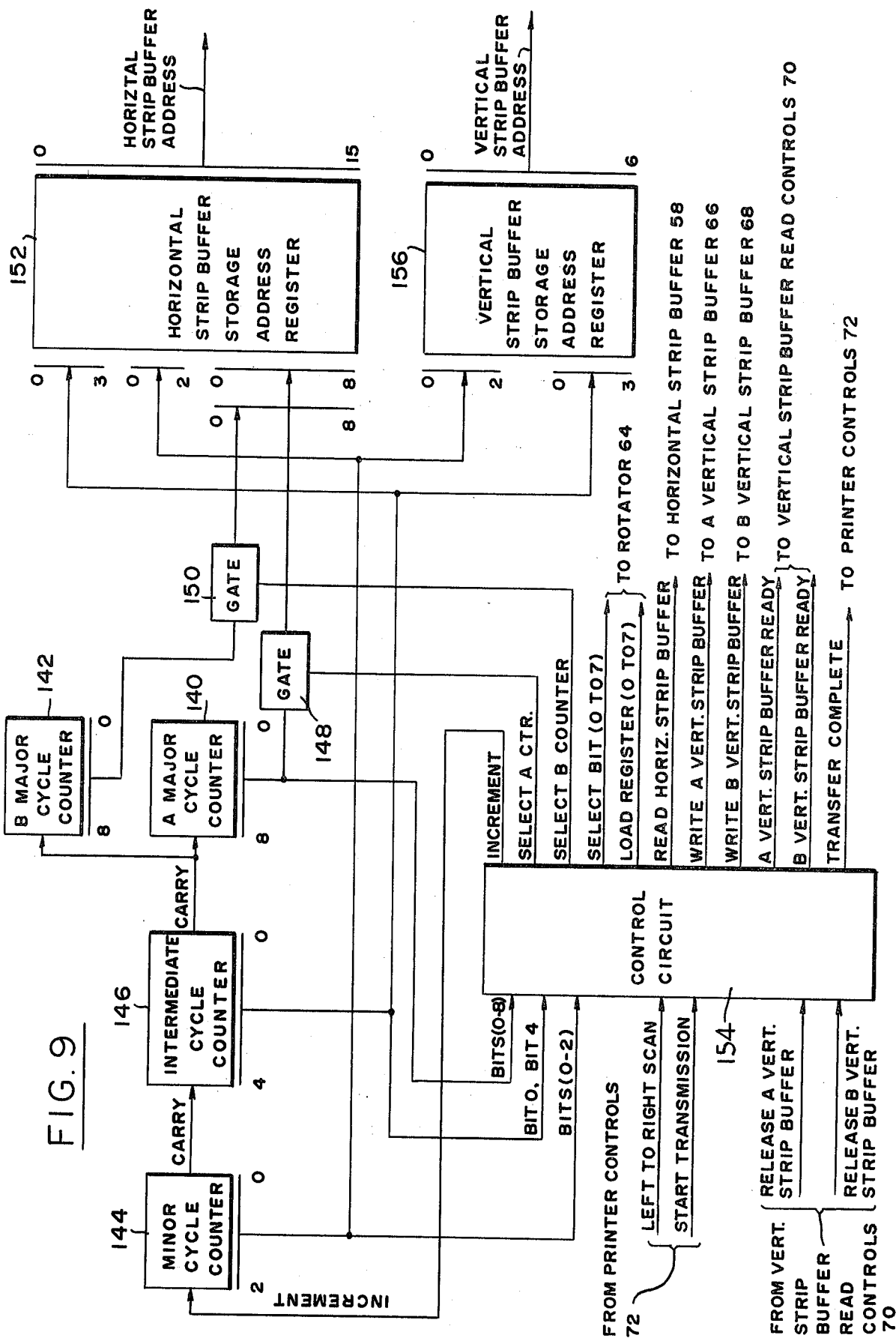
FIG. 9 is a block diagram of a portion of the control circuitry of the system of FIG. 3.

Referring to FIG. 9 which shows the transfer controls 62 in detail the base address is supplied by A and B major cycle counters 140 and 142 respectively. The A major cycle counter 140 is initialized to select 64 bytes for the A nozzles. Each time 128 bytes of data are transferred, the A major cycle counter 140 is incremented by one for left to right scan or decremented by one for right to left scan. Operation of the B major cycle counter 142 is the same as the A major cycle counter 140 except that the B major cycle counter is initialized to a count which is three less than the count of the A major cycle counter for scan in either direction.

Using a hexidecimal addressing scheme, initialization of the A and B major cycle counters 140 and 142 is as follows:

Table 1

| Scan Direction | A major cycle counter 140 | B major cycle counter 142 |
|---|---|---|
| Left to right | 000 | 1FD |
| Right to left | 1C4 | 1C1 |

As just described the A and B major cycle counters 140 and 142 provide the base addresses identifying the columns within the horizontal strip buffer 58 from which bytes for modulating the A and B nozzles are to be taken. The displacement part of the addressing which defines the individual scan lines within the byte columns is provided by a minor cycle counter 144 and an intermediate cycle counter 146. Unlike the A and B major cycle counters 140 and 142 which are loadable up-down binary counters, the minor and intermediate cycle counters 144 and 146 comprise simple binary counters which count up from and can be reset to zero. The counters 144 and 146 combine with the A and B major cycles 140 and 142 to provide the dual functions of memory addressing and sequence control.

The outputs of the A and B major cycle counters 140 and 142 are coupled through a pair of gates 148 and 150, respectively to a horizontal strip buffer storage address register 152 which provides the horizontal strip buffer address. The gates 148 and 150 are operated in alternate fashion by a control circuit 154. At the beginning of each loading operation of one of the vertical strip buffers 66 and 68, a "Select A Counter" signal from the control circuit 154 activates the gate 148 to provide the counter from the A major cycle counter 140 to the horizontal strip buffer storage address register 152 to select the appropriate byte column within the horizontal strip buffer 58 to be used to modulate the A nozzles 42. When the 60 bytes from the odd-numbered scan lines have been rotated and stored the control circuit 154 terminates the "Select A Counter" signal and provides a "Select B Counter" signal to the gate 150 to couple the count from the B major cycle counter 142 to the horizontal strip buffer storage address register 152 to address the appropriate byte column within the horizontal strip buffer 58 so that the 60 bytes from the even numbered scan lines thereof can be rotated and stored for subsequent modulation of the B nozzles 44. The address provided by the storage address register 152 is comprised of nine low order bits and seven high order bits. The low order bits which define the base of the address are provided by the A and B major cycle counters 140 and 142. The high order bits identifying the scan line to be addressed are provided by the minor cycle counter 144 and the intermediate cycle counter 146 which are also coupled to the horizontal strip buffer storage address register 152 as well as to a vertical strip buffer storage address register 156, the latter providing the vertical strip buffer addresses for loading the new vertical bytes from the rotator 64 in one or the other of the vertical strip buffers 66 and 68.

The minor cycle counter 144 is operated in response to "increment" pulses from the control circuit 154 with each increment corresponding to the loading of a different byte from the horizontal strip buffer 58 into the rotator 64 or the transfer of each new byte from the rotator 64 into one of the vertical strip buffers 66 and 68. Each increment pulse is applied to advance the minor cycle counter 144 to a count of eight with the three different bits 0, 1 and 2 thereof being applied to the control circuit 154. The carry output of the minor cycle counter 144 is supplied to advance the intermediate cycle counter 146. The 4th bit of the intermediate cycle counter is applied to the control circuit 145 to indicate when the minor cycle counter 144 has reached a count of eight. The carry output of the intermediate cycle counter 146 is applied to change by one the count of the A and B major cycle counters 140 and 142 each time 120 bytes from the horizontal strip buffer 58 have been rotated and applied to modulate the nozzles.

The initialization of the A and B major cycle counters 140 and 142, the minor cycle counter 144 and the intermediate cycle counter 146 is shown in the following table:

Table 2

| Start Transfer - Left to Right Scan: | | |
|---|---|---|
| A major cycle counter 140 | = 000 | Count Up |
| B major cycle counter 142 | = 1FD | Count Up |
| Intermediate cycle counter 146 | = 000 | Count Up |
| Minor cycle counter 144 | = 000 | Count Up |
| Start Transfer - Right to Left Scan: | | |
| A major cycle counter 140 | = 1C4 | Count Down |
| B major cycle counter 142 | = 1C1 | Count Down |
| Intermediate cycle counter 146 | = 000 | Count Up |
| Minor cycle counter 144 | = 000 | Count Up |

The counting sequence of the A and B major cycle counters 140 and 142, the minor cycle counter 144 and the intermediate cycle counter 146 is shown by the following table:

Table 3

| Scan | Intermed. Cycle Counter 146 Bit 4 | Minor Cycle Counter 144 Bit 0 | Bit 1 | Bit 2 | Read Cycle | | | Write Cycle | |
|---|---|---|---|---|---|---|---|---|---|
| | 0 | 0 | 0 | 0 | Read | Hor. Strip | Buf. | Load | R0 |
| | 0 | 0 | 0 | 1 | " | " | " | " | R1 |
| | 0 | 0 | 1 | 0 | " | " | " | " | R2 |
| | 0 | 0 | 1 | 1 | " | " | " | " | R3 |
| | 0 | 1 | 0 | 0 | " | " | " | " | R4 |
| | 0 | 1 | 0 | 1 | " | " | " | " | R5 |
| | 0 | 1 | 1 | 0 | " | " | " | " | R6 |
| | 0 | 1 | 1 | 1 | " | " | " | " | R7 |
| R-L | 1 | 0 | 0 | 0 | Select | Bit | 7 | Write | VSB |
| " | 1 | 0 | 0 | 1 | " | " | 6 | " | " |
| " | 1 | 0 | 1 | 0 | " | " | 5 | " | " |
| " | 1 | 0 | 1 | 1 | " | " | 4 | " | " |
| " | 1 | 1 | 0 | 0 | " | " | 3 | " | " |
| " | 1 | 1 | 0 | 1 | " | " | 2 | " | " |
| " | 1 | 1 | 1 | 0 | " | " | 1 | " | " |
| " | 1 | 1 | 1 | 1 | " | " | 0 | " | " |
| L-R | 1 | 0 | 0 | 0 | " | " | 0 | " | " |
| " | 1 | 0 | 0 | 1 | " | " | 1 | " | " |
| " | 1 | 0 | 1 | 0 | " | " | 2 | " | " |
| " | 1 | 0 | 1 | 1 | " | " | 3 | " | " |

Table 3-continued

| " | 1 | 1 | 0 | 0 | " | " | 4 | " | " |
|---|---|---|---|---|---|---|---|---|---|
| " | 1 | 1 | 0 | 1 | " | " | 5 | " | " |
| " | 1 | 1 | 1 | 0 | " | " | 6 | " | " |
| " | 1 | 1 | 1 | 1 | " | " | 7 | " | " |

Table 3 shows the 16 counts required to transfer each group of eight bytes from the horizontal strip buffer 58 to the rotator 64 and the transfer of eight new bytes from the rotator 64 into one of the vertical strip buffers 66 and 68. The first eight rows in Table 3 illustrate the first eight counts during which eight bytes are addressed and transferred, one at a time, from the horizontal strip buffer 58 to the rotator 64. The minor cycle counter 144 changes each of bits 0, 1 and 2 thereof in response to each increment pulse from the control circuit 154. Bit 4 of the intermediate cycle counter 146 remains at "0" to indicate to the control circuit 154 that bytes are being addressed in the horizontal strip buffer 58 and transferred to the rotator 64. The "Read Cycle" portion of Table 3 denotes the addressing which is taking place during each count. During the eight counts the horizontal strip buffer 58 is being read by sequentially addressing eight different bytes. At the same time load commands are sequentially provided to each of the eight different registers comprising the rotator 64. The first register 110 shown in FIG. 8 is designated "R0" in Table 3, the last register 112 is designated "R7" and the intervening six registers are designated "R1-R6". Enabling of each register occurs simultaneously with the reading out from the horizontal strip buffer 58 of a byte to be entered in that register.

At the end of the first eight counts shown in Table 3 eight different bytes have been read out of the horizontal strip buffer 58 and stored in the eight different registers of the rotator 64. The next eight rows in Table 8 correspond to the next eight counts for a scan from right to left and the last eight rows in Table 3 represent the next eight counts for a scan from left to right. It will be seen that upon the ninth count, bit 4 of the intermediate cycle counter 146 changes from "0" to "1" to indicate to the control circuit that eight bytes have been stored in the rotator 64 and are ready for rotation and storage in one of the vertical strip buffers 66 and 68. The minor cycle counter 144 sequences through the next eight counts in response to increment pulses from the control circuit 154 in the same manner as during the initial eight counts. The "Read Cycle" portion of Table 3 indicates that bits 7–0 in the rotator 64 are sequentially selected for a scan from right to left and, conversely, bits 0–7 are sequentially selected for a scan from left to right. The "select bit" signals are applied sequentially to the eight different enable lines 116 as described in connection with FIG. 8. Simultaneously with the generation of each "Select Bit" signal the desired storage location within one of the vertical strip buffers for the new byte being generated is addressed as represented by the "Write VSB" designation in Table 3. The minor cycle counter 144 and the intermediate cycle counter 146 accomplish this addressing via the vertical strip buffer storage address 156. The minor cycle counter 144 provides three high order bits within the vertical strip buffer storage address register 156 which sequentially address each of the eight different byte positions across the vertical strip buffer as the eight counts are executed. The intermediate cycle counter 146 provides four low order bits within the vertical strip buffer storage address register 156 which address one of the eight byte columns within the vertical strip buffer. Each time a new count of sixteen is begun the intermediate cycle counter 146 causes the storage address register 156 to address the next byte column in the vertical strip buffer.

Referring again to FIG. 9 the control circuit 154 provides the eight different "select bit" signals and the eight different register loading commands to the rotator 64 as previously described. A "Read" signal is provided to sequence the horizontal strip buffer 58 when bytes are to be transferred therefrom. "Write" signals are provided to sequence the A or B vertical strip buffers 66, 68 when new bytes from the rotator 64 are to be transferred into one of the vertical strip buffers. Each time one of the vertical strip buffers 66, 68 is ready to receive a new group of data from the horizontal strip buffer 58 via the rotator 64, a "Ready" signal is provided to the vertical strip buffer read control 70 indicating that one of the vertical strip buffers has been completely loaded and is ready to be read out to modulate the ink jet nozzles. Conversely the vertical strip buffer read controls 70 provide a "Release" signal to the control circuit 154 when one or both of the vertical strip buffers are available to begin receiving bytes from the horizontal strip buffer 58 and the rotator 64. The printer controls 72 provide signals to the control circuit 154 indicating whether the ink jet head assembly 26 is sweeping from left to right or from right to left so that the control circuit 154 can make appropriate changes to compensate for changes in direction. The control circuit 154 in turn provides a signal to the printer control 72 each time transfer of a group of data through the system has been completed. The control circuit 154 comprises standard logic circuitry for implementing the following control functions expressed in the Boolean convention:

Increment: After every read/write cycle.

Select A major counter 140: $\overline{\text{(Intermediate counter bit 0)}}$

Select B major counter 142: $\overline{\text{Select A major counter}}$

Write A vertical strip buffer 66: (A major counter bit 8)

$\overline{\text{(A major cycle counter bit 8)}}$ (Write vertical strip buffer)

Write B vertical strip buffer 68:

(A major cycle counter bit 8) (Write vertical strip buffer)

A vertical strip buffer ready:

(Int. cycle counter carry) $\overline{\text{(A major cycle counter bit 8)}}$

B vertical strip buffer ready:

(Int. cycle counter carry) (A major cycle counter bit 8)

Transfer complete: (L/R scan) (A major cycle counter = 1C5)+

(L/R scan) (A major cycle counter = 1FF)

Figure 10:
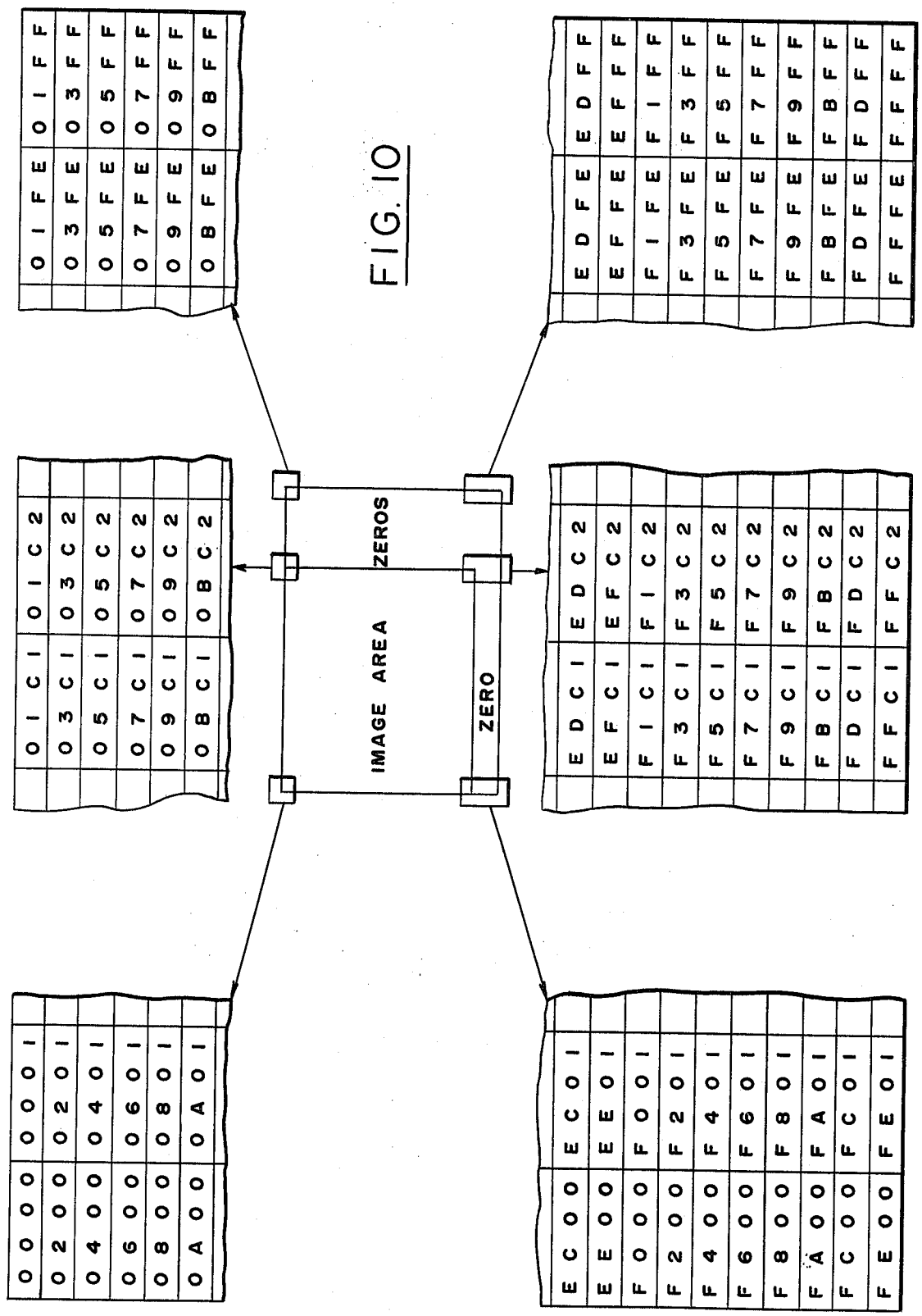
FIG. 10 is a diagrammatic illustration of the horizontal strip buffer of the system of FIG. 3, useful in explaining the addressing technique for the horizontal strip buffer.

As previously noted the addresses are expressed in a hexidecimal format. Examples of this are shown in FIG. 10 which illustrates the hexidecimal addresses of the byte positions at the various boundaries of the horizontal strip buffer 58. FIG. 10 is useful in understanding Tables 4, 5 and 6 set forth hereafter to illustrate the address sequencing by the arrangement of FIG. 9.

Table 4

| L/R Scan | | | Minor Cycle | | | | | | | |
|---|---|---|---|---|---|---|---|---|---|---|
| | | | 0 | 1 | 2 | 3 | 4 | 5 | 6 | 7 |
| 0 | Load Rotator | (HSB Add) | 0000 | 0400 | 0800 | 0C00 | 1000 | 1400 | 1800 | 1C00 |
| | Write | (VSB Add) | 00 | 10 | 20 | 30 | 40 | 50 | 60 | 70 |
| 1 | Load Rotator | (HSB Add) | 2000 | 2400 | 2800 | 2C00 | 3000 | 3400 | 3800 | 3C00 |
| | Write | (VSB Add) | 01 | 11 | 21 | 31 | 41 | 51 | 61 | 71 |
| 2 | Load Rotator | (HSB Add) | 4000 | 4400 | 4800 | 4C00 | 5000 | 5400 | 5800 | 5C00 |
| | Write | (VSB add) | 02 | 12 | 22 | 32 | 42 | 52 | 62 | 72 |
| 3 | Load Rotator | (HSB Add) | 6000 | 6400 | 6800 | 6C00 | 7000 | 7400 | 7800 | 7C00 |
| | Write | (VSB Add) | 03 | 13 | 23 | 33 | 43 | 53 | 63 | 73 |
| 4 | Load Rotator | (HSB Add) | 8000 | 8400 | 8800 | 8C00 | 9000 | 9400 | 9800 | 9C00 |
| | Write | (VSB Add) | 04 | 14 | 24 | 34 | 44 | 54 | 64 | 74 |
| 5 | Load Rotator | (HSB Add) | A000 | A400 | A800 | AC00 | B000 | B400 | B800 | BC00 |
| | Write | (VSB Add) | 05 | 15 | 25 | 35 | 45 | 55 | 65 | 75 |
| 6 | Load Rotator | (HSB Add) | C000 | C400 | C800 | CC00 | D000 | D400 | D800 | DC00 |
| | Write | (VSB Add) | 06 | 16 | 26 | 36 | 46 | 56 | 66 | 76 |
| 7 | Load Rotator | (HSB Add) | E000 | E400 | E800 | EC00 | F000 | F400 | F800 | FC00 |
| | Write | (VSB Add) | 07 | 17 | 27 | 37 | 47 | 57 | 67 | 77 |
| 8 | Load Rotator | (HSB Add) | 01FD | 05FD | 09FD | 0DFD | 11FD | 15FD | 19FD | 1DFD |
| | Write | (VSB Add) | 08 | 18 | 28 | 38 | 48 | 58 | 68 | 78 |
| 9 | Load Rotator | (HSB Add) | 21FD | 25FD | 29FD | 2DFD | 31FD | 35FD | 39FD | 3DFD |
| | Write | (VSB Add) | 09 | 19 | 29 | 39 | 49 | 59 | 69 | 79 |
| A | Load Rotator | (HSB Add) | 41FD | 45FD | 49FD | 4DFD | 51FD | 55FD | 59FD | 5DFD |
| | Write | (VSB Add) | 0A | 1A | 2A | 3A | 4A | 5A | 6A | 7A |
| B | Load Rotator | (HSB Add) | 61FD | 65FD | 69FD | 6DFD | 71FD | 75FD | 79FD | 7DFD |
| | Write | (VSB Add) | 0B | 1B | 2B | 3B | 4B | 5B | 6B | 7B |
| C | Load Rotator | (HSB Add) | 81FD | 85FD | 89FD | 8DFD | 91FD | 95FD | 99FD | 9DFD |
| | Write | (VSB Add) | 0C | 1C | 2C | 3C | 4C | 5C | 6C | 7C |
| D | Load Rotator | (HSB Add) | A1FD | A5FD | A9FD | ADFD | B1FD | B5FD | B9FD | BDFD |
| | Write | (VSB Add) | 0D | 1D | 2D | 3D | 4D | 5D | 6D | 7D |
| E | Load Rotator | (HSB Add) | C1FD | C5FD | C9FD | CDFD | D1FD | D5FD | D9FD | DDFD |
| | Write | (VSB Add) | 0E | 1E | 2E | 3E | 4E | 5E | 6E | 7E |
| F | Load Rotator | (HSB Add) | E1FD | E5FD | E9FD | EDFD | F1FD | F5FD | F9FD | FDFD |
| | Write | (VSB Add) | 0F | 1F | 2F | 3F | 4F | 5F | 6F | 7F |

Table 4 illustrates the address sequencing at the beginning of the scan of a horizontal strip from left to right. The table also represents the address sequencing for the 453rd cycle of a scan from right to left. The numbers 0-7 at the left of Table 4 encompass the addressing required to transfer sixty bytes from odd numbered scan lines within a byte column in the horizontal strip buffer 58 to one of the vertical strip buffers 66 and 68 by the rotator 64 for modulation of the A nozzles 42. The numbers 8 and 9 and the letters A-F at the left of Table 4 encompass the addressing required to transfer 60 bytes from even numbered scan lines within a different byte column in the horizontal strip buffer 58 to the vertical strip buffer by the rotator 64 for modulation of the B nozzles 44. The numbers 0-9 and letters A-F correspond to the count within the intermediate cycle counter 146. Each number or letter encompasses the sixteen different counts set forth in Table 3. The addressing of the horizontal strip buffer (HSB add.) during the first eight counts are set forth in Table 4 in columns labeled 0-7. The addresses within one of the vertical strip buffers (VSB Add.) during the next eight counts are respectively set forth within the columns 0-7 of FIG. 4.

Thus at the beginning of the sequence shown in Table 4 the byte within the first scan line of the first byte column at the address 0000 within the horizontal strip buffer 58 is transferred into the rotator 64. During the next count the byte within the third scan line of the first byte column at the address 0400 is transferred into the second register of the rotator 64. The process continues until during the eighth count the byte within the fifteenth scan line of the first byte column at the address 1C00 is transferred into the eighth register of the rotator 64. On the ninth count the bit 4 of the intermediate cycle counter 146 changes from "0" to "1" as shown in Table 3 to indicate that the rotator 64 is loaded and the data therein is to be transferred into one of the vertical strip buffers. The address 00 is used to locate the first byte position at the upper left hand corner of the vertical strip buffer where the bit 0 byte from the rotator 64 is to be stored. During the next count the address 10 is used to locate the second byte space within the first byte column in the vertical strip buffer for storage of the bit 1 byte from the rotator 64. The process continues until on the sixteenth count the address 70 is used to locate the eighth byte position in the first byte column of the vertical strip buffer for storage of the bit 7 byte from the rotator 64. The system continues through seven more groups of 16 counts, at which point the 60 bytes from the odd-numbered scan lines within the first byte column of the horizontal strip buffer 58 have been transferred into the vertical strip buffer by the rotator. At the beginning of the step designated "8" at the left of Table 4, addressing is changed from the A major cycle counter 140 to the B major cycle counter 142. The byte at the first even scan line of a new column at the address 01FD is transferred into the rotator 64. The system continues in this fashion until the 60 bytes from even-numbered scan lines have been transferred via the rotator 64 into the vertical strip buffer for modulation of the B nozzles 44. At this point the A and B major cycle counters 140 and 142 are incremented by one so as to commence the next addressing sequence which is set forth in Table 5 below.

Table 5

| L/R Scan | | | Minor Cycle | | | | | | | |
|---|---|---|---|---|---|---|---|---|---|---|
| | | | 0 | 1 | 2 | 3 | 4 | 5 | 6 | 7 |
| 0 | Load Rotator | (HSB Add) | 0001 | 0401 | 0801 | 0C01 | 1001 | 1401 | 1801 | 1C01 |
| | Write | (VSB Add) | 00 | 10 | 20 | 30 | 40 | 50 | 60 | 70 |
| 1 | Load Rotator | (HSB Add) | 2001 | 2401 | 2801 | 2C01 | 3001 | 3401 | 3801 | 3C01 |
| | Write | (VSB Add) | 01 | 11 | 21 | 31 | 41 | 51 | 61 | 71 |
| 2 | Load Rotator | (HSB Add) | 4001 | 4401 | 4801 | 4C01 | 5001 | 5401 | 5801 | 5C01 |

Table 5-continued

| | L/R Scan | | | | | Minor Cycle | | | | |
|---|---|---|---|---|---|---|---|---|---|---|
| | | | 0 | 1 | 2 | 3 | 4 | 5 | 6 | 7 |
| | Write | (VSB Add) | 02 | 12 | 22 | 32 | 42 | 52 | 62 | 72 |
| 3 | Load Rotator | (HSB Add) | 6001 | 6401 | 6801 | 6C01 | 7001 | 7401 | 7801 | 7C01 |
| | Write | (VSB Add) | 03 | 13 | 23 | 33 | 43 | 53 | 63 | 73 |
| 4 | Load Rotator | (HSB Add) | 8001 | 8401 | 8801 | 8C01 | 9001 | 9401 | 9801 | 9C01 |
| | Write | (VSB Add) | 04 | 14 | 24 | 34 | 44 | 54 | 4 | 74 |
| 5 | Load Rotator | (HSB Add) | A001 | A401 | A801 | AC01 | B001 | B401 | B801 | BC01 |
| | Write | (VSB Add) | 05 | 15 | 25 | 35 | 45 | 55 | 65 | 75 |
| 6 | Load Rotator | (HSB Add) | C001 | C401 | C801 | CC01 | D001 | D401 | D801 | DC01 |
| | Write | (VSB Add) | 06 | 16 | 26 | 36 | 46 | 56 | 66 | 76 |
| 7 | Load Rotator | (HSB Add) | E001 | E401 | E801 | EC01 | F001 | F401 | F801 | FC01 |
| | Write | (VSB Add) | 07 | 17 | 27 | 37 | 47 | 57 | 67 | 77 |
| 8 | Load Rotator | (HSB Add) | 01FE | 05FE | 09FE | 0DFE | 11FE | 15FE | 19FE | 1DFE |
| | Write | (VSB Add) | 08 | 18 | 28 | 38 | 48 | 58 | 68 | 78 |
| 9 | Load Rotator | (HSB Add) | 21FE | 25FE | 29FE | 2DFE | 31FE | 35FE | 39FE | 3DFE |
| | Write | (VSB Add) | 09 | 19 | 29 | 39 | 49 | 59 | 69 | 79 |
| A | Load Rotator | (HSB Add) | 41FE | 45FE | 49FE | 4DFE | 51FE | 55FE | 59FE | 5DFE |
| | Write | (VSB Add) | 0A | 1A | 2A | 3A | 4A | 5A | 6A | 7A |
| B | Load Rotator | (HSB Add) | 61FE | 65FE | 69FE | 6DFE | 71FE | 75FE | 79FE | 7DFE |
| | Write | (VSB Add) | 0B | 1B | 2B | 3B | 4B | 5B | 6B | 7B |
| C | Load Rotator | (HSB Add) | 81FE | 85FE | 89FE | 8DFE | 91FE | 95FE | 99FE | 7DFE |
| | Write | (VSB Add) | 0C | 1C | 2C | 3C | 4C | 5C | 6C | 7C |
| D | Load Rotator | (HSB Add) | A1FE | A5FE | A9FE | ADFE | B1FE | B5FE | B9FE | BDFE |
| | Write | (VSB Add) | 0D | 1D | 2D | 3D | 4D | 5D | 6D | 7D |
| E | Load Rotator | (HSB Add) | C1FE | C5FE | C9FE | CDFE | D1FE | D5FE | D9FE | DDFE |
| | Write | (VSB ADd) | 0E | 1E | 2E | 3E | 4E | 5E | 6E | 7E |
| F | Load Rotator | (HSB Add) | E1FE | E5FE | E9FE | EDFE | F1FE | F5FE | F9FE | FDFE |
| | Write | (VSB Add) | 0F | 1F | 2F | 3F | 4F | 5F | 6F | 7F |

By comprising some of the addresses of Table 5 with those shown in FIG. 10, it will be understood how the system performs proper addressing as it steps from byte column to byte column along the horizontal strip in the buffer 58. Table 5 sets forth the address sequencing for the 452nd cycle of a scan from right to left or the second cycle of a scan from left to right.

Table 6 shows the address sequencing for the 450th cycle of a left to right scan. This is the last byte column of the horizontal strip to be printed by the A nozzles before the band of zeros at the righthand end at the horizontal strip buffer 58 is entered. It also represents the 4th cycle during a scan from right to left.

Table 6

| | L/R Scan | | | | | Minor Cycle | | | | |
|---|---|---|---|---|---|---|---|---|---|---|
| | | | 0 | 1 | 2 | 3 | 4 | 5 | 6 | 7 |
| 0 | Load Rotator | (HSB Add) | 01C1 | 05C1 | 09C1 | 0DC1 | 11C1 | 1501 | 1901 | 1DC1 |
| | Write | (VSB Add) | 00 | 10 | 20 | 30 | 40 | 50 | 60 | 70 |
| 1 | Load Rotator | (HSB Add) | 21C1 | 25C1 | 29C1 | 2DC1 | 31C1 | 35C1 | 39C1 | 3DC1 |
| | Write | (VSB Add) | 01 | 11 | 21 | 31 | 41 | 51 | 61 | 71 |
| 2 | Load Rotator | (HSB Add) | 41C1 | 45C1 | 49C1 | 4DC1 | 51C1 | 55C1 | 59C1 | 5DC1 |
| | Write | (VSB Add) | 02 | 12 | 22 | 32 | 42 | 52 | 62 | 72 |
| 3 | Load Rotator | (HSB Add) | 61C1 | 65C1 | 69C1 | 6DC1 | 71C1 | 75C1 | 79C1 | 7DC1 |
| | Write | (VSB Add) | 03 | 13 | 23 | 33 | 43 | 53 | 63 | 73 |
| 4 | Load Roator | (HSB Add) | 81C1 | 85C1 | 89C1 | 8DC1 | 91C1 | 95C1 | 99C1 | 9DC1 |
| | Write | (VSB Add) | 04 | 14 | 24 | 34 | 44 | 54 | 64 | 74 |
| 5 | Load Rotator | (HSB Add) | A1C1 | A5C1 | A9C1 | ADC1 | B1C1 | B5C1 | B9C1 | BDC1 |
| | Write | (VSB Add) | 05 | 15 | 25 | 35 | 45 | 55 | 65 | 75 |
| 6 | Load Rotator | (HSB Add) | C1C1 | C5C1 | C9C1 | CDC1 | D1C1 | D5C1 | D9C1 | DDC1 |
| | Write | (VSB Add) | 06 | 16 | 26 | 36 | 46 | 56 | 66 | 76 |
| 7 | Load Rotator | (HSB Add) | E1C1 | C5C1 | E9C1 | EDC1 | F1C1 | F5C1 | F9C1 | FDC1 |
| | Write | (VSB Add) | 07 | 17 | 27 | 37 | 47 | 57 | 67 | 77 |
| 8 | Load Rotator | (HSB Add) | 03BE | 07BE | 0BEE | 0FBE | 13BE | 17BE | 1BBE | 1FBE |
| | Write | (VSB Add) | 08 | 18 | 28 | 38 | 48 | 58 | 68 | 78 |
| 9 | Load Rotator | (HSB Add) | 23BE | 27BE | 2BBE | 2FBE | 33BE | 37BE | 3BBE | 3FBE |
| | Write | (VSB Add) | 09 | 19 | 29 | 39 | 49 | 59 | 69 | 79 |
| A | Load Rotator | (HSB Add) | 43BE | 47BE | 4BBE | 4FBE | 53BE | 57BE | 5BBE | 5FBE |
| | Write | (VSB Add) | 0A | 1A | 2A | 3A | 4A | 5A | 6A | 7A |
| B | Load Rotator | (HSB Add) | 63BE | 67BE | 6BBE | 7FBE | 73BE | 77BE | 7BBE | 7FBE |
| | Write | (VSB Add) | 0B | 1B | 2B | 3B | 4B | 5B | 6B | 7B |
| C | Load Rotator | (HSB Add) | 83BE | 87BE | 8BBE | 8FBE | 93BE | 97BE | 9BBE | 9FBE |
| | Write | (VSB Add) | 0C | 1C | 2C | 3C | 4C | 5C | 6C | 7C |
| D | Load Rotator | (HSB Add) | A3BE | A7BE | ABBE | AFBE | B3BE | B7BE | BBBE | BFBE |
| | Write | (VSB Add) | 0D | 1D | 2D | 3D | 4D | 5D | 6D | 7D |
| E | Load Rotator | (HSB Add) | C3BE | C7BE | CBBE | CFBE | D3BE | D7BE | DBBE | DFBE |
| | Write | (VSB Add) | 0E | 1E | 2E | 3E | 4E | 5E | 6E | 7E |
| F | Load Rotator | (HSB Add) | E3BE | E7BE | EBBE | EFBE | F3BE | F7BE | FBBE | FFBE |
| | Write | (VSB Add) | 0F | 1F | 2F | 3F | 4F | F | 6F | 7F |

While the invention has been particularly shown and described with reference to preferred embodiments thereof, it will be understood by those skilled in the art that various changes in form and details may be made therein without departing from the spirit and scope of the invention.

That which is claimed is:

1. For use wtih a printer employing multiple print elements for printing bit serial image data and storage means for storing a plurality of scan lines, wherein each scan line is comprised of a succession of bytes with each byte comprising plural bits, wherein data is supplied one scan line at a time from an image source and wherein the multiple print elements require bits from a plurality of the scan lines simultaneously to effect printing, apparatus for remapping said image data into a format utilization by the printer elements, comprising:

a first buffer capable of storing a plurality of the scan lines;

means for transferring scan lines from the storage means to the first buffer;
a second buffer;
a rotator including means for storing N bytes at a time;
means for transferring one group of bytes at a time from scan lines stored in the first buffer in parallel to the rotator;
means for transferring a group of new bytes from the group of bytes stored in the rotator to the second buffer, each new byte being comprised of a plurality of bits with each bit being taken from a different one of the group of bytes stored in the rotator; and
means for applying the group of new bytes to the multiple print elements.

2. The invention set forth in claim 1, wherein each byte of the scan lines is comprised of a like succession of N numbered bits, the means for transferring one group of bytes at a time from scan lines stored in the buffer is operative to transfer N bytes at a time in parallel to the rotator, and the means for transferring a group of new bytes from the group of bytes stored in the rotator to the second buffer is operative to transfer N new bytes from the group N bytes stored in the rotator, each new byte comprising the same numbered bit from each of the N bytes stored in the rotator.

3. An arrangement for remapping image data for use in a printer system comprising:
first storage means;
means for assembling data in the form of an image in the storage means;
second storage means;
means for successively transferring the data comprising each of a succession of elongated strips of the image from the first storage means to the second storage means;
third storage means; and
means for successively transferring the data comprising each of a succession of the elongated portions of each strip stored in the second storage means from the second storage means to the third storage means, the elongated portions having a direction of elongation different from the direction of elongation of the elongated strips.

4. The invention set forth in claim 3, wherein each elongated strip is comprised of a plurality of parallel scan lines of data bits and each of the elongated portions comprises a bit from each of the scan lines in an elongated strip.

5. The invention set forth in claim 4, further including a head assembly having a plurality of print elements, a printable medium and means for moving the head assembly to move the print elements thereon relative to the printable medium simultaneously, wherein each elongated strip is comprised of a number of the parallel scan lines at least equal to the number of print elements of the head, and further including means for successively applying the elongated portions stored in the third storage means to modulate the print elements of the head, each bit of each elongated portion being applied to modulate a different one of the print elements.

6. A printer system comprising the combination of:
first buffer means;
means for storing in the first buffer means one scan line at a time the data comprising the successive scan lines of an image to be printed;
second buffer means;
means for successively transferring the data comprising different groups of like size of the scan lines of the image from the first buffer means to the second buffer means, the different groups comprising strips of the image;
storage means;
means for transferring the data comprising each of a succession of segments along the length of each strip from the second buffer means into the storage means, each segment being comprised of parallel rows of data with each row corresponding to a different one of the scan lines within the strip;
third buffer means;
means responsive to transfer of the data comprising each segment to the storage means for transferring the data comprising like portions of each of the different rows thereof from the storage means into the third buffer means as a plurality of different columns;
a movable print head assembly having a plurality of different print elements; and
means responsive to the data comprising different groups of the columns in the third buffer means for applying the data to the different print elements of the movable print head assembly.

7. The invention set forth in claim 6, wherein each of the rows comprises a byte made up of N bits, and the means for transferring the data from the storage means into the third buffer means as a series of different columns is operative to transfer a different one of the bits of each row stored in the storage means to the third buffer means as one of N different columns.

8. The invention set forth in claim 7, wherein the means for successively transferring the data comprising each of a succession of segments from the second buffer means into the storage means is operative to transfer N rows at a time from the segment into the storage means, and each of the columns comprises a byte made up of N bits, each of which is taken from a different one of the N rows stored in the storage means.

9. The invention set forth in claim 6, wherein each strip is comprised of a number of scan lines at least equal to the number of different print elements of the movable print head assembly.

10. The invention set forth in claim 6, wherein the print head assembly is movable along a print axis, the print elements are arranged into two different groups and alternate between the two different groups with increasing distance from the print axis, the means for successively transferring the data comprising each of a succession of segments from the second buffer means to the storage means is operative to transfer rows from alternate scan lines within the segment and thereafter the remaining scan lines within the segement, the means for transferring data from the storage means into the third buffer means transfers data from the alternate scan lines and the remaining scan lines as two different groups of columns, and the means for applying the data to the different print elements is operative to apply the data from one of the two different groups of columns to one of the two different groups of print elements and the data from the other one of the two different groups of columns to the other one of the two different groups of print elements.

11. An arrangement for remapping image data for use with a multi-element print head assembly comprising:
a printable medium;

a movable print head assembly having a plurality of print elements which simultaneously scan the printable medium in response to motion of the print head asembly relative to the printable medium;

first buffer means;

means for storing in the first buffer means one scan line at a time a portion of the data comprising the successive scan lines of an image to be printed, each scan line comprising a like succession of horizontal bytes with each horizontal byte comprising a like number of bits and the horizontal bytes of all of the scan lines stored in the first buffer means forming a succession of byte columns along the length of the scan lines, each byte column comprising a horizontal byte from each of the stored scan lines;

a plurality of registers, each having at least as many bit positions as the number of bits in each horizontal byte;

means for transferring the horizontal bytes from each column of bytes in the first buffer means into the registers;

second buffer means;

means for transferring a plurality of vertical bytes from the registers to the second buffer means, each vertical byte being comprised of a different bit from each of the horizontal bytes in the registers; and means for simultaneously applying the different bits of the vertical bytes stored in the second buffer means to the print elements of the movable print head assembly.

12. The invention set forth in claim 11, wherein the means for transferring a plurality of vertical bytes from the registers to the second buffer means comprises a plurality of AND circuits, each having a pair of inputs and an output, the first input of each AND circuit being coupled to a different bit position of a different one of the plurality of registers, a plurality of enable lines, each being coupled to the second inputs of the AND circuits having the first input thereof coupled to a different bit position in eajh of the registers, a plurality of OR circuits, each coupled between the second buffer means and the outputs of the AND circuits having the first input thereof coupled to the bit positions of a different register, and means for sequentially energizing the enable lines.

13. An arrangement for remapping data for use with a multi-element head assembly in a printer system comprising a page buffer coupled to store the data comprising successive scan lines of an image to be printed;

a horizontal strip buffer;

means responsive to storage of data comprising a selected number of scan lines in the page buffer at least equal to the number of elements of the multi-element head assembly for transferring the data comprising the selected number of scan lines from the page buffer into the horizontal strip buffer;

at least one vertical strip buffer;

means responsive to the presence of data comprising the selected number of scan lines in the horizontal strip buffer for transferring the data comprising each of a succession of columns along the length of the selected number of scan lines from the horizontal strip buffer to the vertical strip buffer; and means responsive to the transfer of data comprising a column to the vertical strip buffer for applying the data to modulate the elements of the multi-element head assembly.

14. The invention set forth in claim 13, wherein each column is comprised of parallel rows of bits along the portion of each scan line within the column and the means for transferring the data comprising each of a succession of columns from the horizontal strip buffer to the vertical strip buffer is operative to re-group the data comprising each column into parallel column of bits as it is transferred from the horizontal strip buffer to the vertical strip buffer.

15. The invention set forth in claim 13, further including a second vertical strip buffer, and wherein the means for transferring the data comprising each of a succession of columns from the horizontal strip buffer is operative to alternate the transfer of data comprising the successive columns between the first-mentioned vertical strip buffer and the second vertical strip buffer and the means for applying the data to modulate the elements of the multi-element head assembly is operative to alternatively apply the data from the first-mentioned vertical strip buffer and the second vertical strip buffer to modulate the elements of the multi-element head assembly.

16. The invention set forth in claim 13, wherein the multi-element head assembly comprises an ink jet head assembly which is operative to undergo motion along a print axis and which has approximately 120 ink jet nozzles defining 120 equally spaced scan lines parallel to the print axis, the ink jet nozzles which define adjacent scan lines alternating between first and second groups of 60 nozzles each, the nozzles within the first and second groups lying along first and second parallel, spaced-apart axes, the means for transferring the data comprising the selected number of scan lines from the page buffer into the horizontal strip buffer is operative to transfer 120 scan lines from the page buffer into the horizontal strip buffer; the data comprising each column consisting of a byte within each of the 120 scan lines, the means for transferring the data comprising each of a succession of columns from the horizontal strip buffer to the vertical strip buffer is operative to transfer the bytes from odd numbered ones of the scan lines in a given column for storage in the vertical strip buffer followed by transfer of the bytes from even numbered ones of the scan lines in a different column displaced from the given column by the distance between the axes of the first and second groups of nozzles for storage in the vertical strip buffer, and the means for applying the data to modulate the elements of the multi-element head assembly is operative to apply the bytes from odd numbered ones of the scan lines to modulate the first group of nozzles and the bytes from even numbered one of the scan lines to modulate the second group of nozzles upon transfer of the bytes from the horizontal strip buffer to the vertical strip buffer.

17. The invention set forth in claim 16, wherein each byte is comprised of a succession of 8 bits, the vertical strip buffer comprises storage space for 8 columns of bytes with 16 bytes in each column, and the means for transferring the data comprising each of a succession of columns from the horizontal strip buffer to the vertical strip buffer is operative to reformat the bits of the bytes in the odd numbered and even numbered scan lines so as to transfer a different bit from each of the bytes in the odd numbered scan lines as the first 8 bytes in one of 8 columns of bytes in the vertical strip buffer and a different bit from each of the bytes in the even numbered scan lines as the second 8 bytes in one of 8 columns of bytes in the vertical strip buffer.

18. The invention set forth in claim 17, wherein the means for transferring the data comprising each of a succession of columns from the horizontal strip buffer to the vertical strip buffer is operative to reformat and transfer 8 bytes at a time from first the odd numbered scan lines and then the even numbered scan lines.

* * * * *